C. W. HOOD.
AGRICULTURAL MACHINE.
APPLICATION FILED MAR. 16, 1912.
1,051,589.
Patented Jan. 28, 1913.
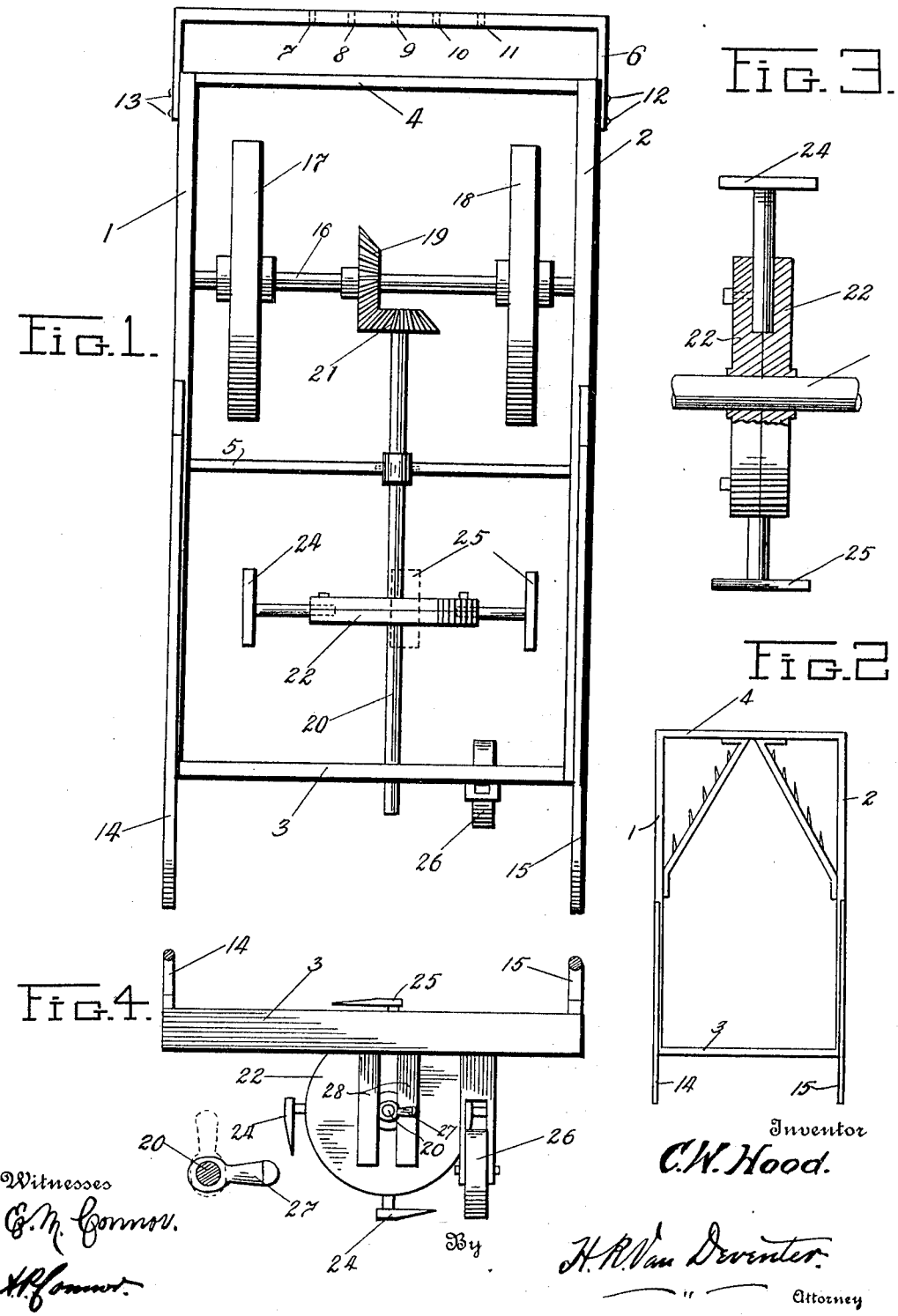
Inventor
C. W. Hood.
Witnesses
By H. R. Van Deventer
Attorney

UNITED STATES PATENT OFFICE.

CLADIUS WHITFIELD HOOD, OF LAMAR, SOUTH CAROLINA.

AGRICULTURAL MACHINE.

1,051,589.      Specification of Letters Patent.      Patented Jan. 28, 1913.

Application filed March 16, 1912. Serial No. 684,233.

*To all whom it may concern:*

Be it known that I, CLADIUS WHITFIELD HOOD, a citizen of the United States, residing at Lamar, in the county of Darlington and State of South Carolina, have invented certain new and useful Improvements in Agricultural Machines, of which the following is a specification, reference being had to the accompanying drawings.

My invention relates to agricultural machines, and particularly to choppers for thinning out plants in a row, such as young cotton plants, or for cutting stalks.

This machine is also convertible into a harrow or the like, and consists of an improved and simplified construction of few parts so designed that when used as a chopper the chopping hoes are readily adjustable in any suitable position.

There are other advantages which will be hereinafter described and claimed.

In the accompanying drawings Figure 1 is a view from above, of my invention. Fig. 2 is a view of the harrow attachment. Fig. 3 is a detailed view of the flanges carrying the chopper hoes. Fig. 4 is a detail of the hoe shaft adjustment.

Similar reference characters refer to similar parts throughout the drawings.

1, 2, 3, 4 and 5 are members of wood or iron forming a suitable frame. These are bolted or fastened together in any suitable manner. At the front of the frame is the clevis or beam bar 6, to which may be fastened a swingletree. Suitable holes 7, 8, 9, 10 and 11 are provided for attaching the swingletree, and the clevis bar is adjustable in any suitable manner such as the holes in the ends of same in which are placed suitable pins indicated at 12 and 13.

14 and 15 are handles projecting rearwardly for the purpose of guiding the machine.

16 is an axle mounted in the frame in any suitable manner so as to be readily removable therefrom. Attached to the axle are the draft wheels 17 and 18 and the suitable bevel gear 19, these and the axle forming a unit. At right angles to the axle 16 is positioned the shaft 20, which is suitably supported by a swivel bearing or journal in the frame member 5. Rigidly attached to this shaft is a suitable bevel gear 21 and the pair of flanges 22, which, when bolted together, to form the hoe support shown in detail in Fig. 3. In this support is placed a suitable number of hoes indicated at 24 and 25, the stems of the hoes being adjustable between the flanges. The rear end of the shaft 20 may be provided with a suitable handle 27 extending rearwardly outside of the frame and between two vertical members 28 between which it may be clamped or held in any suitable manner, thus providing an adjustment similar to that indicated in Fig. 3, whereby the hoes may be adjusted in relation to the ground. It will be understood that gears 19 and 21 are made with a relatively large amount of clearance so that the slight movement given to 21, when the shaft 20 is adjusted, will not cause them to bind, at the same time the swivel bearing will permit the shaft 20 to be slidably moved in it, and thereby provide for any further adjustment that may be required in the relative position of these gears. A guide wheel 26 is attached to the frame member 3 so that it will support the weight of the rear end of the machine.

In operation as a chopper, the machine is drawn along a row of plants or stalks, the draft wheels of the machine straddling the row. As the machine moves forward the draft wheels 17 and 18 revolve together with the shaft 16 carrying the gear 19, which revolves gear 21 and its shaft 20, thereby revolving the member 22 carrying the hoes. The distance between the hoes and the ground being suitably adjusted, the hoes will cut stalks or thin out young plants, in the latter case the hoes being so spaced or such a number of them being used that only a certain number of plants will be removed from the row; for instance every alternate plant, if desired.

It is obvious this machine may be used to perform any other work than that above mentioned, for which a machine of this character may be utilized, and the action of the hoes directly on the plants crosswise of the row is more positive than if the cutting action was in the same plane as the movement of the machine. This feature is of particular advantage in thinning out young cotton plants, as the hoes working at right angles do not damage or touch any plants except those to be eliminated, as the plants to remain will pass freely between the hoes, same being properly spaced in the flanges to permit of this. Harrow or other attachments may be used in the frame work of this chopper by removing the draft wheels, chopper mechanism and frame member 5, by bolting a suitable harrow such as shown in Fig. 2 to the front frame member 4 and the side members 1 and 2. It is obvious that various forms of harrows and similar devices may be used.

I claim:

A cotton chopper comprising in combination a frame-work, an axle mounted in said frame-work and adjacent the front portion thereof, supporting wheels secured to said axle, a gear rigidly secured to said axle, a swivel bearing supported by said frame-work, a shaft supported and slidable in said bearing, a gear rigidly secured to one end of said shaft and arranged to engage with the first mentioned gear and be actuated thereby even when said shaft is slightly tilted, said shaft being supported by said bearing adjacent to said end, a pair of uprights secured to said frame-work arranged to permit the shaft to be moved in a vertical plane there-between, a cam like member mounted on the shaft and adapted to engage with the sides of said uprights and adjustably hold the shaft therebetween, and adjustable chopper heads mounting the shaft between the bearing and uprights.

In testimony whereof I hereunto affix my signature in the presence of two witnesses.

CLADIUS WHITFIELD HOOD.

Witnesses:
P. B. McLendor,
S. L. Pipkin.

---

Copies of this patent may be obtained for five cents each, by addressing the "Commissioner of Patents, Washington, D. C."